United States Patent
Otani et al.

(10) Patent No.: US 9,248,702 B2
(45) Date of Patent: Feb. 2, 2016

(54) TWO-WHEELED AUTOMOTIVE VEHICLE TIRE

(71) Applicant: SUMITOMO RUBBER INDUSTRIES LTD., Kobe-shi, Hyogo (JP)

(72) Inventors: Masafumi Otani, Kobe (JP); Narihiro Tahara, Kobe (JP); Kiyoshi Funahara, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 346 days.

(21) Appl. No.: 13/730,104

(22) Filed: Dec. 28, 2012

(65) Prior Publication Data

US 2013/0167993 A1    Jul. 4, 2013

(30) Foreign Application Priority Data

Dec. 29, 2011   (JP) .................. 2011-290323

(51) Int. Cl.
*B60C 11/00* (2006.01)

(52) U.S. Cl.
CPC .............. *B60C 11/00* (2013.01); *B60C 11/005* (2013.01); *B60C 11/0058* (2013.04); *B60C 11/0075* (2013.04); *B60C 2011/0025* (2013.04); *B60C 2200/10* (2013.04)

(58) Field of Classification Search
CPC ............. B60C 11/0041; B60C 11/005; B60C 11/0058; B60C 11/0066; B60C 11/0075; B60C 2011/0016; B60C 2011/0025
USPC ...................................... 152/209.5
See application file for complete search history.

(56) References Cited

U.S. PATENT DOCUMENTS

| 6,286,575 B1* | 9/2001 | Nakamura ................ 152/526 |
| 2010/0132862 A1* | 6/2010 | Terada .................. 152/209.5 |
| 2010/0212799 A1* | 8/2010 | Kasai .................... 152/454 |
| 2010/0282386 A1* | 11/2010 | Katayama et al. ....... 152/209.11 |

FOREIGN PATENT DOCUMENTS

| EP | 1632364 | * | 3/2006 |
| JP | 2007-108805 | * | 4/1995 |
| JP | 2006-199112 A | | 8/2006 |
| JP | 2007-137309 | * | 6/2007 |

(Continued)

OTHER PUBLICATIONS

English machine translation of JP2007-137309, dated Jun. 2007.*
English machine translation of JP2009-119967, dated Jun. 2009.*
English machine translation of JP2007-108805, dated Apr. 1995.*

(Continued)

*Primary Examiner* — Steven D Maki
*Assistant Examiner* — Robert Dye
(74) *Attorney, Agent, or Firm* — Birch, Stewart, Kolasch & Birch, LLP (57) ABSTRACT

Rolling resistance performance, high-speed-durability performance, and cornering performance are simultaneously realized at high levels. A two-wheeled automotive vehicle tire 1 includes a tread portion having an outer surface that extends so as to be curved such that the outer surface is convex outward in the tire radial direction, and is arc-shaped. A tread rubber 2G includes a center rubber CR, shoulder rubbers SH, and middle rubbers MD. The center rubber CR includes a center cap layer CRc and a center base layer CRb. A loss tangent tan δ1b of the center base layer CRb and a width L1b thereof in the tire axial direction are each limited so as to be set within a predetermined range.

8 Claims, 5 Drawing Sheets

(56) References Cited

FOREIGN PATENT DOCUMENTS

| | | | |
|---|---|---|---|
| JP | 2007-223376 A | | 9/2007 |
| JP | 2008-189041 A | | 8/2008 |
| JP | 2009-119967 | * | 6/2009 |

OTHER PUBLICATIONS

Blow, C.M.. Rubbert Technology and Manufacture. Jul. 1975. CRC Press. Chapter 9, pp. 308-344.*

European Search Report dated Apr. 8, 2013 for Application No. 12 19 5475.

* cited by examiner

TWO-WHEELED AUTOMOTIVE VEHICLE TIRE

TECHNICAL FIELD

The present invention relates to two-wheeled automotive vehicle tires that enable rolling resistance performance, high-speed-durability performance, and cornering performance to be simultaneously realized at high levels.

BACKGROUND ART

Figure 5:
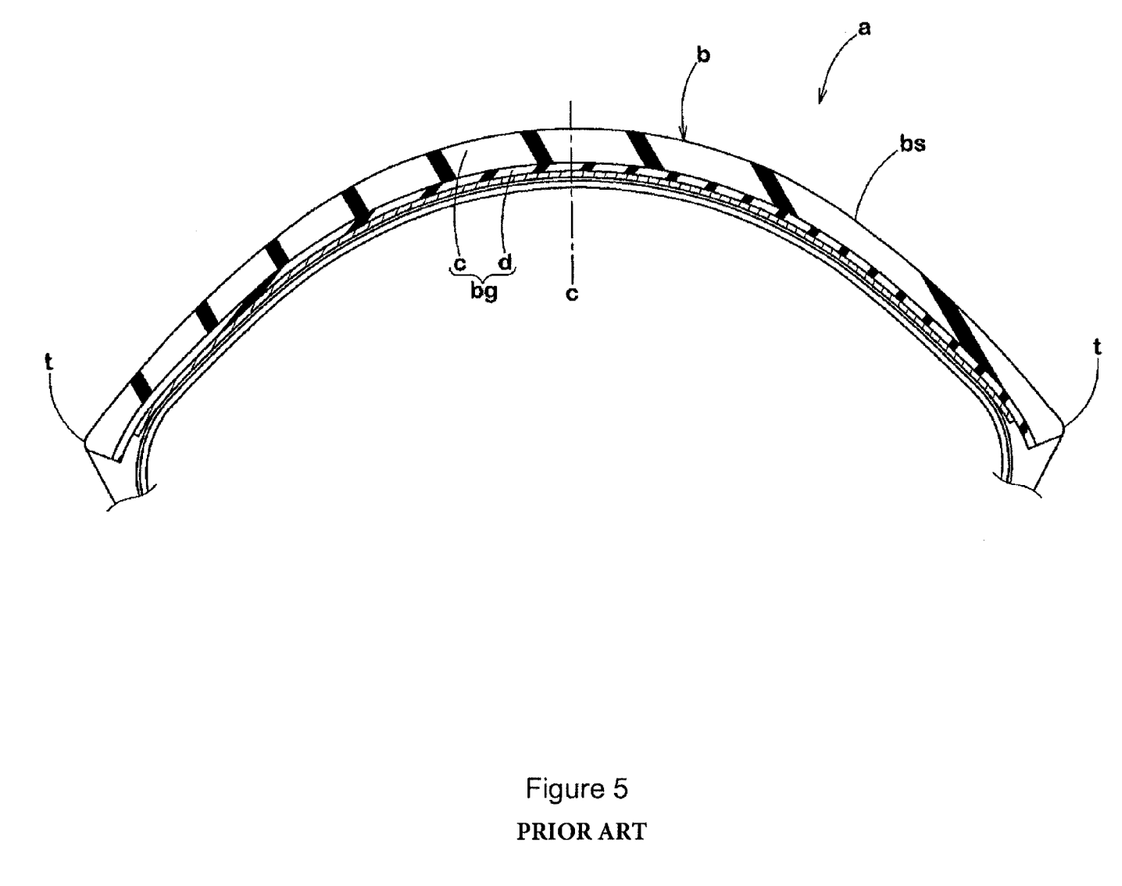
FIG. 5 is a cross-sectional view of a conventional two-wheeled automotive vehicle tire.

In recent years, with enhancement of performance of two-wheeled automotive vehicles, two-wheeled automotive vehicle tires are required to have high-speed-durability performance. For example, as shown in FIG. 5, a two-wheeled automotive vehicle tire a has been known in which a tread rubber bg includes: a cap layer c forming an outer surface bs of a tread portion b; and a base layer d disposed inward of the cap layer in the tire radial direction, and the base layer d is formed of a rubber having a loss tangent tan δ reduced, in order to enhance the high-speed-durability performance.

In the two-wheeled automotive vehicle tire a thus formed, since the base layer d is formed of a rubber in which heat emission is reduced, the tread rubber bg can be effectively restrained from being subjected to thermal destruction (becoming porous) to be in a sponge-like state due to heat emission during high speed running, thereby enabling improvement of high-speed-durability performance. Further, the base layer d is formed of a rubber having a small hysteresis loss, and therefore rolling resistance performance can be also improved. The related art is as follows.

CITATION LIST

Patent Literature

[PTL 1] Japanese Laid-Open Patent Publication No. 2007-223376

DISCLOSURE OF THE INVENTION

Problems to be Solved by the Invention

However, in the two-wheeled automotive vehicle tire a as described above, since the base layer d having a small hysteresis loss is disposed entirely between tread ends t in the tire axial direction, grip performance cannot be sufficiently exhibited during cornering in which the tread rubber bg contacts with the ground mainly on the tread end t sides, so that a problem arises that cornering performance may be deteriorated.

The present invention is made to solve the aforementioned problem, and a main object of the preset invention is to make available a two-wheeled automotive vehicle tire that has a fundamental structure in which a loss tangent of a center base layer and a width thereof in the tire axial direction are each limited so as to be set within a predetermined range, to simultaneously realize rolling resistance performance, high-speed-durability performance, and cornering performance at high levels.

Solution to the Problems

A first embodiment according to the present invention is directed to a two-wheeled automotive vehicle tire which includes a tread portion having an outer surface that extends so as to be curved such that the outer surface is convex outward in a tire radial direction and is arc-shaped, and a tread rubber disposed in the tread portion includes: a center rubber disposed in a region including a tire equator as a center thereof; shoulder rubbers disposed on tread end sides; and middle rubbers disposed between the center rubber and the shoulder rubbers, respectively, and the center rubber includes a center cap layer of the outer surface of the tread portion; and a center base layer disposed inward of the center cap layer in the tire radial direction, and a loss tangent of the center base layer is less than a loss tangent of each of the center cap layer, the middle rubbers, and the shoulder rubbers, and a width of the center base layer in a tire axial direction is greater than a length of a ground contact surface in the tire axial direction during straight running, and ranges from 50% of a length from the tire equator to a tread end along the outer surface of the tread portion to 95% thereof.

A second embodiment is the two-wheeled automotive vehicle tire according to the first embodiment in which a cross section of each middle rubber has a tapered shape in which a length of the cross section in the tire axial direction is reduced inward in the tire radial direction.

A third embodiment is the two-wheeled automotive vehicle tire according to the first embodiment in which a loss tangent $\tan \delta 1b$ of the center base layer, a loss tangent $\tan \delta 1c$ of the center cap layer, a loss tangent $\tan \delta 2$ of each middle rubber, and a loss tangent $\tan \delta 3$ of each shoulder rubber satisfy the following expression (1):

$$\tan \delta 1b < \tan \delta 1c < \tan \delta 2 < \tan \delta 3 \qquad (1).$$

A fourth embodiment is the two-wheeled automotive vehicle tire according to the first embodiment in which a complex elastic modulus $E^*1b$ of the center base layer, a complex elastic modulus $E^*1c$ of the center cap layer, a complex elastic modulus $E^*2$ of each middle rubber, and a complex elastic modulus $E^*3$ of each shoulder rubber satisfy the following expression (2):

$$E^*1b < E^*1c < E^*2 < E^*3 \qquad (2).$$

A fifth embodiment is the two-wheeled automotive vehicle tire according to the first embodiment in which a rubber hardness $Hs1b$ of the center base layer, a rubber hardness $Hs1c$ of the center cap layer, a rubber hardness $Hs2$ of each middle rubber, and a rubber hardness $Hs3$ of each shoulder rubber satisfy the following expression (3):

$$Hs1b < Hs1c < Hs2 < Hs3 \qquad (3).$$

A sixth embodiment is the two-wheeled automotive vehicle tire according to the first embodiment in which the middle rubbers are formed of a rubber having a uniform composition and the shoulder rubbers are formed of a rubber having a uniform composition, over a range from an inside in the tire radial direction toward the outer surface of the tread portion.

A seventh embodiment is the two-wheeled automotive vehicle tire according to the first embodiment in which each middle rubber includes a middle cap layer of the outer surface of the tread portion, and a middle base layer disposed inward of the middle cap layer in the tire radial direction, and each shoulder rubber includes a shoulder cap layer of the outer surface of the tread portion, and a shoulder base layer disposed inward of the shoulder cap layer in the tire radial direction.

An eighth embodiment is the two-wheeled automotive vehicle tire according to the seventh embodiment in which a loss tangent $\tan \delta 2c$ of the middle cap layer and a loss tangent $\tan \delta 2b$ of the middle base layer satisfy the following expression (4), and a loss tangent tan δ3c of the shoulder cap layer and a loss tangent tan δ3b of the shoulder base layer satisfy the following expression (5):

$$\tan \delta 2c > \tan \delta 2b \quad (4),$$

$$\tan \delta 3c > \tan \delta 3b \quad (5).$$

A ninth embodiment is the two-wheeled automotive vehicle tire according to the seventh or eighth embodiment in which the loss tangent tan δ1b of the center base layer, the loss tangent tan δ2b of the middle base layer, and the loss tangent tan δ3b of the shoulder base layer satisfy the following expression (6):

$$\tan \delta 1b < \tan \delta 2b < \tan \delta 3b \quad (6).$$

In the description herein, unless otherwise specified, for example, dimensions of components of the tire are represented as values specified in a normal state in which a tire is mounted to a normal rim and is filled with air at a normal internal pressure, and no load is applied to the tire.

Further, the "normal rim" described above represents a rim that is defined, in a standard system including a standard with which the tire complies, by the standard for each tire, and is, for example, the "standard rim" in the JATMA standard, the "Design Rim" in the TRA standard, or the "Measuring Rim" in the ETRTO standard.

Further, the "normal internal pressure" represents an air pressure that is defined, in a standard system including a standard with which the tire complies, by the standard for each tire, and is the "maximum air pressure" in the JATMA standard, the maximum value recited in the table "TIRE LOAD LIMITS AT VARIOUS COLD INFLATION PRESSURES" in the TRA standard, or the "INFLATION PRESSURE" in the ETRTO standard.

Further, in the description herein, the loss tangent tan δ and the complex elastic modulus E* are represented as values measured by a viscoelasticity spectrometer manufactured by Iwamoto Seisakusho, in compliance with the standard of JIS-K6394, under the following conditions.

Initial strain: 10%
Amplitude: ±1%
Frequency: 10 Hz
Deformation mode: tension
Temperature: 70°

Further, the rubber hardness Hs represents a durometer A hardness that is measured at 23° C. by a type A durometer in compliance with the standard of JIS-K6253.

Advantageous Effect of the Invention

In the two-wheeled automotive vehicle tire of the present invention, the outer surface of the tread portion extends so as to be curved such that the outer surface is convex outward in the tire radial direction, and is arch-shaped. Such a two-wheeled automotive vehicle tire enables a sufficient contact area to be obtained even during cornering in which a camber angle is increased.

Further, the tread rubber disposed in the tread portion includes: a center rubber disposed in a region including the tire equator as its center; shoulder rubbers disposed on the tread end sides; and middle rubbers disposed between the center rubber and the shoulder rubbers, respectively. The center rubber includes a center cap layer of the outer surface of the tread portion, and a center base layer disposed inward of the center cap layer in the tire radial direction.

Furthermore, a loss tangent of the center base layer is less than a loss tangent of each of the center cap layer, the middle rubbers, and the shoulder rubbers. Thus, in the two-wheeled automotive vehicle tire, a center base portion of the center rubber that contacts with the ground mainly during straight running is formed of a rubber in which heat emission is relatively reduced, and therefore the tread rubber can be effectively restrained from being subjected to thermal destruction (becoming porous) to be in a sponge-like state, thereby enabling high-speed-durability performance to be improved. Furthermore, since the center base layer is formed of a rubber having a relatively small hysteresis loss, rolling resistance performance can be improved during straight running.

Further, since the middle rubbers and the shoulder rubbers that contact with the ground mainly during cornering are each formed of a rubber having a relatively great hysteresis loss, grip performance can be effectively exhibited during cornering, thereby enabling improvement of cornering performance.

Further, a width of the center base layer in the tire axial direction is greater than a length of the ground contact surface in the tire axial direction during straight running, and ranges from 50% of a length from the tire equator to the tread end along the outer surface of the tread portion to 95% thereof. Thus, in the two-wheeled automotive vehicle tire, the center base layer can be assuredly disposed inward of the ground contact surface in the tire radial direction during straight running, thereby enabling high-speed-durability performance and rolling resistance performance to be improved with an enhanced effectiveness.

MODE FOR CARRYING OUT THE INVENTION

Hereinafter, an embodiment of the present invention will be described with reference to the drawings.

Figure 1:
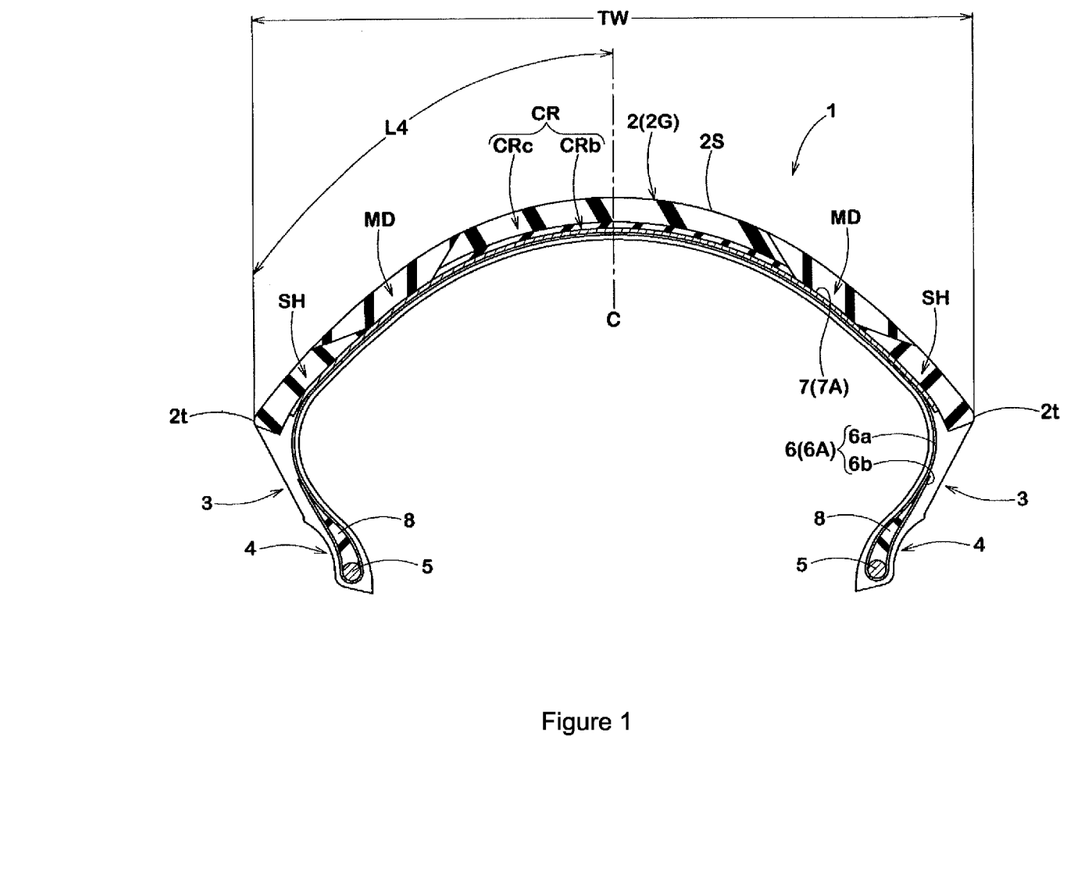
FIG. 1 is a cross-sectional view of a two-wheeled automotive vehicle tire according to an embodiment.

As shown in FIG. 1, a two-wheeled automotive vehicle tire (hereinafter, simply referred to as a "tire") 1 of the present embodiment includes a carcass 6 extending from a tread portion 2 via a sidewall portion 3 to a bead core 5 of a bead portion 4; a tread reinforcing layer 7 disposed outward of the carcass 6 and inward of the tread portion 2 in the tire radial direction; and a tread rubber 2G disposed outward of the tread reinforcing layer 7.

In the tire 1, in order to obtain a sufficient contact area also during cornering in which a camber angle is increased, an outer surface 2S of the tread portion 2 between tread ends 2t and 2t extends so as to be curved such that the outer surface 2S is convex outward in the tire radial direction and is arc-shaped, and further a tread width TW which is a distance between the tread ends 2t and 2t in the tire axial direction is a tire maximum width.

The carcass 6 includes at least one carcass ply 6A. In the present embodiment, the number of the carcass plies 6A is one. The carcass ply 6A includes a body portion 6a that extends from the tread portion 2 via the sidewall portion 3 to the bead core 5 embedded in the bead portion 4, and turned-up portions 6b each of which connects to the body portion 6a and is turned up around the bead core 5.

Further, the carcass ply 6A has carcass cords tilted relative to a tire equator C by an angle ranging, for example, from 65° to 90°. For the carcass cords, for example, organic fiber cords made of a nylon, a polyester, a rayon, or the like are favorably used. Bead apex rubbers 8 formed of a hard rubber are disposed between the body portion 6a and each turned-up portion 6b of the carcass ply 6A.

The tread reinforcing layer 7 is formed as at least one reinforcing ply 7A. In the present embodiment, the number of the reinforcing plies 7A is one. In the at least one reinforcing ply (the reinforcing ply 7A in the present embodiment), for example, reinforcing cords formed of an organic fiber are disposed so as to be tilted relative to the tire circumferential direction by an angle ranging from 15° to 45°.

Figure 2:
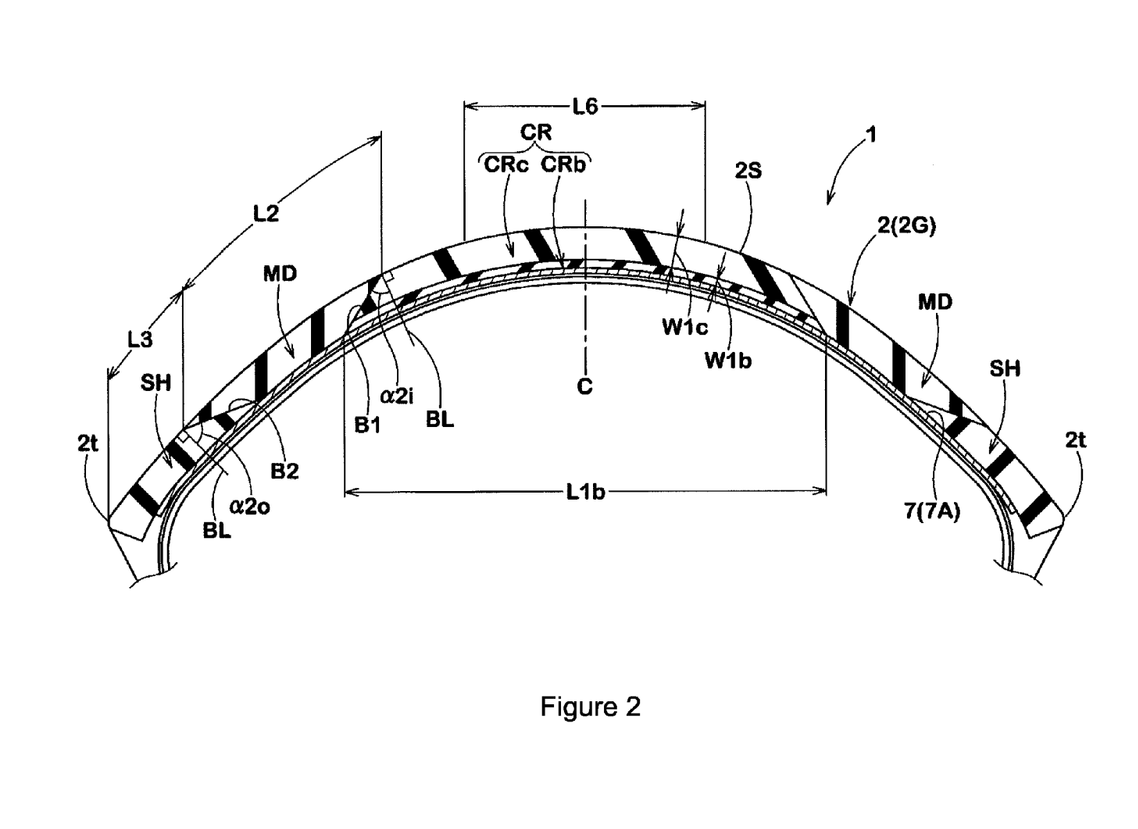
FIG. 2 is an enlarged view of a tread portion of the tire shown in FIG. 1.

As shown in FIG. 1 and FIG. 2, the tread rubber 2G of the present embodiment includes: a center rubber CR disposed in a region including the tire equator C as its center; shoulder rubbers SH disposed on the tread end 2t sides; and middle rubbers MD disposed between the center rubber CR and the shoulder rubbers SH, respectively. The center rubber CR, the middle rubbers MD, and the shoulder rubbers SH are formed of rubber materials having compositions different from each other.

The center rubber CR includes: a center cap layer CRc of the outer surface 2S of the tread portion 2; and a center base layer CRb disposed inward of the center cap layer CRc in the tire radial direction. In the present embodiment, a thickness W1b of the center base layer CRb is set so as to be less than a thickness W1c of the center cap layer CRc, and a ratio W1b/W1c is set such that the thickness W1b ranges from about 10% of the thickness W1c to about 30% thereof.

On the other hand, in the present embodiment, the middle rubbers MD are formed of a rubber having a uniform composition and the shoulder rubbers SH are formed of a rubber having a uniform composition, over a range from the inside in the tire radial direction to the outer surface 2S of the tread portion 2.

Further, a cross-section of each middle rubber MD has a tapered shape in which a cross-sectional length in the tire axial direction is reduced inward in the tire radial direction. Thus, the tread rubber 2G can be formed so as to smoothly change rubber physical properties from the center rubber CR to the shoulder rubbers SH, thereby enabling improvement of transient characteristics.

Further, since a length L2 of each middle rubber MD along the outer surface 2S of the tread portion 2 is set so as to be relatively great, only the middle rubber MD can be caused to contact with the ground mainly in the middle of cornering in which both a driving force due to an accelerator being on and a lateral force due to the cornering are applied and a severity to the tread rubber 2G becomes maximum.

Therefore, the tread rubber 2G is allowed to effectively restrain a step wear and an uneven wear that are likely to occur between the center rubber CR and each middle rubber MD, and between the middle rubbers MD and the shoulder rubbers SH. The length L2 preferably ranges from 45% of a length L4 (shown in FIG. 1) from the tire equator C to each tread end 2t along the outer surface 2S of the tread portion 2, to 65% thereof.

In order to effectively exhibit such an effect, each of an angle $\alpha 2i$ of a boundary line B1 between the center rubber CR and the middle rubber MD relative to a normal line BL extending from the outer surface 2S of the tread portion 2, and an angle $\alpha 2o$ of a boundary line B2 between the middle rubber MD and the shoulder rubber SH relative to the normal line BL, preferably ranges from 15° to 75°.

When the angles $\alpha 2i$ and $\alpha 2o$ are each less than 15°, the boundary lines B1 and B2 are tilted so as to be almost parallel to the normal line BL, and the transient characteristics may not be sufficiently improved. On the other hand, when the angles $\alpha 2i$ and $\alpha 2o$ are each greater than 75°, the length L2 of each middle rubber MD is extremely greater than a length L3 of each shoulder rubber SH along the outer surface 2S, and a grip force may not be exhibited at an edge portion. In this viewpoint, each of the angles $\alpha 2i$ and $\alpha 2o$ is more preferably greater than or equal to 25°, and is more preferably not greater than 65°.

In the present embodiment, a loss tangent $\tan \delta 1b$ of the center base layer CRb is set so as to be less than each of a loss tangent $\tan \delta 1c$ of the center cap layer CRc, a loss tangent $\tan \delta 2$ of each middle rubber MD, and a loss tangent $\tan \delta 3$ of each shoulder rubber SH.

Thus, in the tire 1 of the present embodiment, since the center base layer CRb of the center rubber CR is formed of a rubber in which heat emission is relatively reduced, the tread rubber 2G can be effectively restrained from being subjected to thermal destruction (becoming porous) to be in a sponge-like state during straight running in which the center rubber CR mainly contacts with the ground, thereby enabling improvement of high-speed-durability performance. Furthermore, since the center base layer CRb is formed of a rubber having a relatively small hysteresis loss, rolling resistance performance can be improved during straight running.

On the other hand, since the middle rubbers MD and the shoulder rubbers SH, which contact with the ground mainly during cornering, are each formed of a rubber having a relatively great hysteresis loss. Therefore, grip performance can be effectively exhibited during cornering, thereby enabling improvement of cornering performance.

In order to effectively exhibit such an effect, a width L1b of the center base layer CRb in the tire axial direction is set so as to be greater than a length L6, in the tire axial direction, of a ground contact surface (not shown) in straight running, and preferably ranges from 50% of the length L4 (shown in FIG. 1) to 95% thereof. The length L6 of the ground contact surface is a maximum length of the ground contact surface in the tire axial direction in a normal-load-applied state in which a normal load is applied to the tire 1 in the normal state and the tire 1 is caused to contact with a flat ground surface at a camber angle of V.

The "normal load" described above represents a load that is defined, in a standard system including a standard with which the tire complies, by the standard for each tire, and is the "maximum load carrying capacity" in the JATMA standard, the maximum value recited in the table "TIRE LOAD LIMITS AT VARIOUS COLD INFLATION PRESSURES" in the TRA standard, or the "LOAD CAPACITY" in the ETRTO standard. In a case where no standard is specified, a value suggested by a tire manufacturer is applied.

Thus, the center base layer CRb is assuredly disposed inward of the ground contact surface (not shown) in the tire radial direction during straight running. Therefore, high-speed-durability performance and rolling resistance performance during straight running can be improved with an enhanced effectiveness.

When the width L1b of the center base layer CRb is less than 50% of the length L4 of the tread portion 2, the effect as described above may not be sufficiently exhibited. On the other hand, when the width L1b is greater than 95% of the length L4, regions in which the middle rubbers MD and the shoulder rubbers SH are disposed are excessively reduced, so that cornering performance, and the transient characteristics from straight running to cornering may be deteriorated. In this viewpoint, the width L1b is more preferably greater than or equal to 60% of the length L4, and is more preferably not greater than 85% thereof.

Further, the loss tangent tan δ1b of the center base layer CRb preferably ranges from 0.05 to 0.10. When the loss tangent tan δ1b is greater than 0.10, the high-speed-durability performance and the rolling resistance performance as described above may not be sufficiently exhibited. On the other hand, when the loss tangent tan δ1b is less than 0.05, a hysteresis loss of the center base layer CRb is excessively reduced, and grip performance may not be sufficiently exhibited during straight running. In this viewpoint, the loss tangent tan δ1b is more preferably less than or equal to 0.08, and is more preferably not less than 0.06.

Furthermore, the loss tangent tan δ1b of the center base layer CRb, the loss tangent tan δ1c of the center cap layer CRc, the loss tangent tan δ2 of each middle rubber MD, and the loss tangent tan δ3 of each shoulder rubber SH preferably satisfy the following expression (1).

$$\tan \delta 1b < \tan \delta 1c < \tan \delta 2 < \tan \delta 3 \qquad (1)$$

Thus, the loss tangent tan δ1c of the center cap layer CRc is also set so as to be relatively small, and rolling resistance performance and high-speed-durability performance can be effectively improved during straight running. Further, the loss tangent tan δ2 of each middle rubber MD and the loss tangent tan δ3 of each shoulder rubber SH are set so as to be relatively great, thereby enabling improvement of cornering performance. Further, hysteresis loss is gradually increased in the center rubber CR, the middle rubbers MD, and the shoulder rubbers SH in order, respectively, thereby enabling improvement of transient characteristics from straight running to cornering.

Further, a complex elastic modulus E*1b of the center base layer CRb is set so as to be preferably less than a complex elastic modulus E*1c of the center cap layer CRc, a complex elastic modulus E*2 of each middle rubber MD, and a complex elastic modulus E*3 of each shoulder rubber SH. Further, a rubber hardness Hs1b of the center base layer CRb is set so as to be preferably less than a rubber hardness Hs1c of the center cap layer CRc, a rubber hardness Hs2 of each middle rubber MD, and a rubber hardness Hs3 of each shoulder rubber SH.

Thus, the loss tangent tan δ of the center base layer CRb can be also reduced, and rolling resistance performance can be effectively improved during straight running.

On the other hand, the complex elastic modulus E*2 of each middle rubber MD, the complex elastic modulus E*3 of each shoulder rubber SH, the rubber hardness Hs2 of each middle rubber MD, and the rubber hardness Hs3 of each shoulder rubber SH can be relatively increased. Therefore, a so-called "rigidity", which is a stiffness exhibited during cornering, can be exhibited, thereby enabling effective improvement of cornering performance.

In order to effectively exhibit such an effect, the complex elastic modulus E*1b of the center base layer CRb preferably ranges from 2.50 MPa to 3.50 MPa. When the complex elastic modulus E*1b is greater than 3.50 MPa, the effect described above may not be sufficiently exhibited. On the other hand, when the complex elastic modulus E*1b is less than 2.50 MPa, an elasticity of the center base layer CRb is excessively reduced, so that grip performance may not be sufficiently exhibited during straight running. In this viewpoint, the complex elastic modulus E*1b is more preferably less than or equal to 3.30 MPa, and is more preferably not less than 2.70 MPa.

Similarly, the rubber hardness Hs1b of the center base layer CRb is preferably less than or equal to 60 degrees, and is more preferably less than or equal to 58 degrees, and is preferably not less than 50 degrees, and is more preferably not less than 52 degrees.

Further, the complex elastic modulus E*1b of the center base layer CRb, the complex elastic modulus E*1c of the center cap layer CRc, the complex elastic modulus E*2 of each middle rubber MD, and the complex elastic modulus E*3 of each shoulder rubber SH preferably satisfy the following expression (2).

$$E^*1b < E^*1c < E^*2 < E^*3 \qquad (2)$$

Thus, the complex elastic modulus E*1c of the center cap layer CRc is also set so as to be relatively small, thereby enabling effective improvement of rolling resistance performance during straight running. Further, the complex elastic modulus E*2 of each middle rubber MD and the complex elastic modulus E*3 of each shoulder rubber SH are set so as to be relatively great, thereby enabling effective improvement of cornering performance. Further, the complex elastic modulus is gradually increased from the tire equator C toward each tread end 2t. Therefore, the transient characteristics from straight running to cornering can be improved.

Similarly, the rubber hardness Hs1b of the center base layer CRb, the rubber hardness Hs1c of the center cap layer CRc, the rubber hardness Hs2 of each middle rubber MD, and the rubber hardness Hs3 of each shoulder rubber SH preferably satisfy the following expression (3).

$$Hs1b < Hs1c < Hs2 < Hs3 \qquad (3)$$

Figure 3:
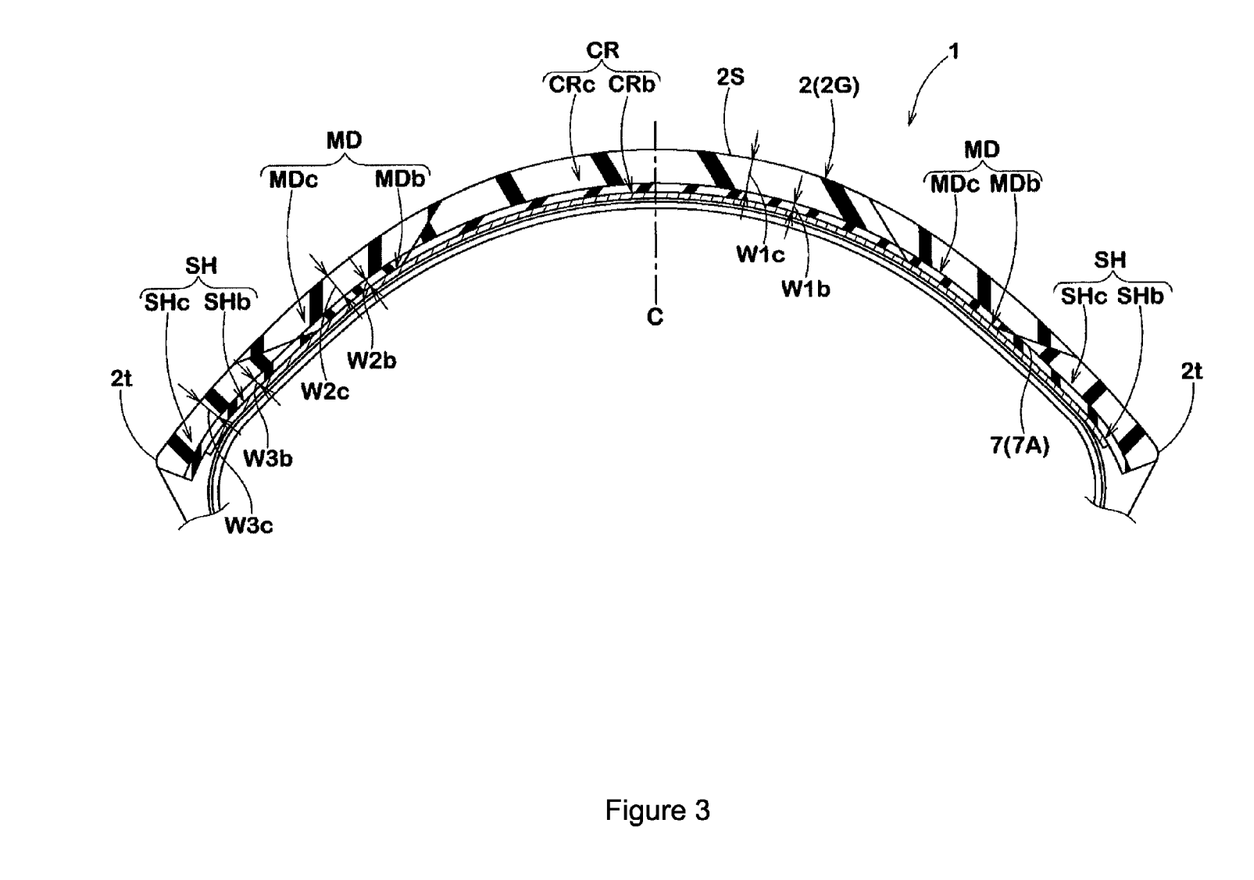
FIG. 3 is an enlarged view of a tread portion of another embodiment.

FIG. 3 shows a tire 1 according to another embodiment of the present invention.

In the tire 1 of the present embodiment, middle rubbers MD include: middle cap layers MDc of the outer surface 2S of the tread portion 2; and middle base layers MDb disposed inward of the middle cap layers MDc in the tire radial direction. A thickness W2b of each middle base layer MDb is set so as to be less than a thickness W2c of each middle cap layer MDc, and a ratio W2b/W2c in the thickness is set so as to be within the same range as the ratio W1b/W1c described above.

In a case where each middle rubber MD is separated as described above as in the present embodiment, a loss tangent twin can be obtained by the following equation (10). Further, a complex elastic modulus E*2 and a rubber hardness Hs2 can be obtained in the same manner as that for the loss tangent tan δ2.

$$\tan \delta 2 = \tan \delta 2c \times (W2c/(W2b+W2c)) + \tan \delta 2b \times (W2b/(W2b+W2c)) \qquad (10)$$

Further, the shoulder rubbers SH include: shoulder cap layers SHc of the outer surface 2S; and shoulder base layers SHb disposed inward of the shoulder cap layers SHc in the tire radial direction. A thickness W3b of each shoulder base layer SHb is set so as to be less than a thickness W3c of each shoulder cap layer SHc, and a ratio W3b/W3c in the thickness is set so as to be within the same range as W1b/W1c described above.

Also in a case where each shoulder rubber SH is separated as described above, a loss tangent tan δ3 of each shoulder rubber SH is obtained as an average of a loss tangent tan δ3c of each shoulder cap layer SHc and a loss tangent tan δ3b of each shoulder base layer SHb. A complex elastic modulus E*3 and a rubber hardness Hs3 are obtained in the same manner.

In the present embodiment, the loss tangent tan δ2c of each middle cap layer MDc and the loss tangent tan δ2b of each middle base layer MDb satisfy the following expression (4), and the loss tangent tan δ3c of each shoulder cap layer SHc and the loss tangent tan δ3b of each shoulder base layer SHb satisfy the following expression (5).

$$\tan \delta 2c > \tan \delta 2b \quad (4)$$

$$\tan \delta 3c > \tan \delta 3b \quad (5)$$

Thus, in the middle rubbers MD and the shoulder rubbers SH, the loss tangent tan δ2b of each middle base layer MDb and the loss tangent tan δ3b of each shoulder base layer SHb are set so as to be relatively small, thereby enabling improvement of rolling resistance performance and high speed cornering performance.

In order to effectively exhibit such an effect, the loss tangent tan δ2b of each middle base layer MDb preferably ranges from 20% of the loss tangent tan δ2c of each middle cap layer MDc, to 45% thereof. When the loss tangent tan δ2b is greater than 45% of the loss tangent tan δ2c, the effect described above may not be sufficiently exhibited. On the other hand, when the loss tangent tan δ2b is less than 20% of the loss tangent tan δ2c, the loss tangent tan δ2b of each middle base layer MDb is excessively reduced, and grip performance may not be sufficiently exhibited during cornering. In this viewpoint, the loss tangent tan δ2b is more preferably less than or equal to 40% of the loss tangent tan δ2c, and is more preferably not less than 25% thereof.

Similarly, the loss tangent tan δ3b of each shoulder base layer SHb is preferably less than or equal to 55% of the loss tangent tan δ3c of each shoulder cap layer SHc, and is more preferably less than or equal to 50% thereof, and is preferably not less than 35% thereof, and is more preferably not less than 40% thereof Further, the loss tangent tan δ2b of each middle base layer MDb, the loss tangent tan δ3b of each shoulder base layer SHb, and the loss tangent tan δ1b of the center base layer CRb preferably satisfy the following expression (6).

$$\tan \delta 1b < \tan \delta 2b < \tan \delta 3b \quad (6)$$

Thus, a hysteresis loss can be gradually increased from the center rubber CR toward the shoulder rubbers SH with enhanced smoothness, thereby enabling cornering performance and transient characteristics from straight running to cornering to be greatly improved.

Figure 4:
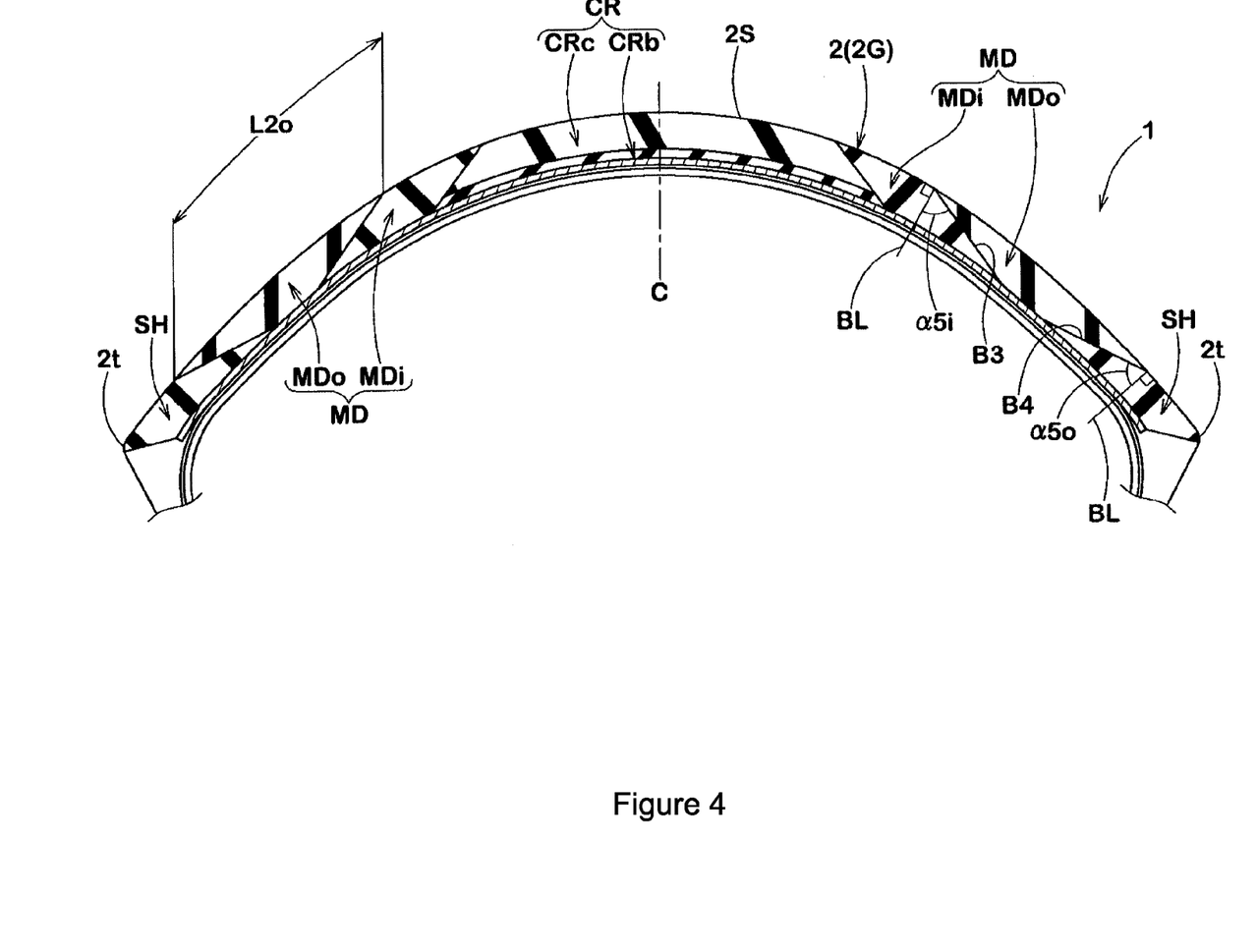
FIG. 4 is an enlarged view of a tread portion of still another embodiment.

FIG. 4 shows a tire 1 according to still another embodiment of the present invention. In the tire 1 of the present embodiment, the middle rubbers MD include: inside middle rubbers MDi disposed on the center rubber CR sides; and outside middle rubbers MDo disposed on the shoulder rubber SH sides.

Further, in the present embodiment, a loss tangent tan δ2i of each inside middle rubber MDi and a loss tangent tan δ2o of each outside middle rubber MDo satisfy the following expression (7).

$$\tan \delta 2i < \tan \delta 2o \quad (7)$$

Thus, in the tire 1, a hysteresis loss can be gradually increased from the center rubber CR toward the shoulder rubbers SH with enhanced smoothness, thereby enabling cornering performance and transient characteristics from straight running to cornering to be greatly improved.

In order to effectively exhibit such an effect, the loss tangent tan δ2i of each inside middle rubber MDi preferably ranges from 80% of the loss tangent tan δ2o of each outside middle rubber MDo to 95% thereof. When the loss tangent tan δ2i is greater than 95% of the loss tangent tan δ2o, the effect described above may not be sufficiently enhanced. On the other hand, when the loss tangent tan δ2i is less than 80% of the loss tangent tan δ2o, a difference in hysteresis loss between the inside middle rubbers MDi and the outside middle rubbers MDo is excessively increased, and cornering performance and transient characteristics may not be sufficiently improved. In this viewpoint, the loss tangent tan δ2i is more preferably less than or equal to 90% of the loss tangent tan δ2o, and is more preferably not less than 85% thereof.

Further, a complex elastic modulus E*2i of each inside middle rubber MDi and a complex elastic modulus E*2o of each outside middle rubber MDo preferably satisfy the following expression (8), and a rubber hardness Hs2i of each inside middle rubber MDi and a rubber hardness Hs2o of each outside middle rubber MDo preferably satisfy the following expression (9).

$$E*2i < E*2o \quad (8)$$

$$Hs2i < Hs2o \quad (9)$$

Thus, the complex elastic modulus and the rubber hardness can be gradually increased from the center rubber CR toward the shoulder rubbers SH with enhanced smoothness, thereby enabling cornering performance and transient characteristics from straight running to cornering to be effectively improved.

In order to effectively exhibit the effect as described above, the complex elastic modulus E*2i of each inside middle rubber MDi is preferably less than or equal to 98% of the complex elastic modulus E*2o of each outside middle rubber MDo, and is more preferably less than or equal to 96% thereof, and is preferably not less than 90% thereof, and is more preferably not less than 92% thereof.

Similarly, the rubber hardness Hs2i of each inside middle rubber MDi is preferably less than or equal to 99% of the rubber hardness Hs2o of each outside middle rubber MDo, and is more preferably less than or equal to 98% thereof, and is preferably not less than 96% thereof, and is more preferably not less than 97% thereof.

Further, a cross-section of each outside middle rubber MDo at which a driving force due to an accelerator being on, and a lateral force due to cornering are maximized among the inside middle rubbers MDi and the outside middle rubbers MDo, preferably has a tapered shape.

Thus, a length L2o of each outside middle rubber MDo along the outer surface 2S of the tread portion 2 is set so as to be relatively great, and therefore only the outside middle rubber MDo can be caused to contact with the ground mainly in the middle of cornering in which the driving force and the lateral force are maximum. Therefore, the tread rubber 2G enables a step wear or an uneven wear which are likely to occur between the inside middle rubbers MDi and the outside middle rubbers MDo and between the outside middle rubbers MDo and the shoulder rubbers SH to be effectively restrained.

In order to effectively exhibit such an effect, the length L2o of each outside middle rubber MDo preferably ranges from 40% of the length L4 (shown in FIG. 1) to 60% thereof. Further, an angle α5i of a boundary line B3 between the inside middle rubber MDi and the outside middle rubber MDo relative to the normal line BL, and an angle α5o of a boundary line B4 between the outside middle rubber MDo and the shoulder rubber SH relative to the normal line BL are preferably set so as to be within the same range as the angles α2i and α2o described above.

Although the preferred embodiments of the present invention have been described above in detail, the present invention is not limited to the embodiments described above with reference to the drawings, and various modifications can be devised to implement the present invention.

EXAMPLE I

Two-wheeled automotive vehicle tires each having the fundamental structure shown in FIG. 1, and each including a center base layer, a center cap layer, middle rubbers, and shoulder rubbers as indicated in table 1, were manufactured and tested for performances. Further, a conventional tire (a loss tangent tan δ of a cap layer: 0.21, a loss tangent tan δ of a base layer: 0.06) as shown in FIG. 5 was similarly tested for comparison. The common specifications are as follows.
Tire size:
Front tire: 120/70ZR17
Rear tire: 190/55ZR17
Rim size:
Front rim: MT3.50×17
Rear rim: MT6.00×17
Tread width TW: 194 mm
Length L4 from tire equator to tread end: 115 mm
Length L2 of middle rubber MD: 55 mm
Ratio L2/L4: 47.8%
Length L6 of ground contact surface in tire axial direction during straight running: 43 mm
Further, a composition of each of the center base layer, the center cap layer, the middle rubbers, and the shoulder rubbers is indicated in table 2. The details are as follows.
natural rubber (NR): RSS#3
styrene-butadiene rubber (SBR): SBR1502 manufactured by Sumitomo Chemical Company, Limited
carbon black: carbon black N326 manufactured by Showa Cabot K. K.
process oil: Diana Process PS32 manufactured by Idemitsu Kosan Co., Ltd.
antioxidant 6C: ANTIGENE (registered trademark) 6C (N-(1,3-dimethylbutyl)-N'-phenyl-p-phenylenediamine) manufactured by Sumitomo Chemical Co., Ltd.
stearic acid: Tsubaki manufactured by Nippon Oil & Fats Co., Ltd.
zinc oxide: two kinds of zinc oxides manufactured by MITSUI MINING & SMELTING CO., LTD.
sulfur: powder sulfur manufactured by Karuizawa Sulfur Co, Ltd.
vulcanization accelerator: NOCCELER (registered trademark) NS (N-tert-butyl-2-benzothiazolylsulfenamide) manufactured by OUCHI SHINKO CHEMICAL INDUSTRIAL CO., LTD
silica: VN3 manufactured by Degussa Japan Co., Ltd
vulcanization accelerator: DPG manufactured by OUCHI SHINKO CHEMICAL INDUSTRIAL CO., LTD
wax: SUNNOC (registered trademark) S manufactured by OUCHI SHINKO CHEMICAL INDUSTRIAL CO., LTD
silane coupling agent: Si266 manufactured by Degussa Japan Co., Ltd
In order to change a loss tangent tans, for example, composition rates of the "SBR", the "silica", and the "silane coupling agent" were adjusted as appropriate. Further, a rubber hardness was changed by adjusting, for example, a composition rate of the "process oil" as appropriate.
The test methods are as follows.

<Cornering performance•Transient characteristics>

Each sample tire was mounted to the rim described above, and was filled with air at an internal pressure of 290 kPa, and was mounted to a two-wheeled automotive vehicle having an engine displacement of 1000 cc. Sensory evaluations were made by a driver as to "grip performance", "cornering stability", and "transient characteristics" obtained when the vehicle had run around a test course of a dry asphalt road surface. The evaluations are represented as scores on the assumption that scores of comparative example 1 are each 100. The greater a value of the score is, the more favorable the result is.

<High-Speed-Durability Performance>

In compliance with the ECE 75, each sample tire was mounted to the rim under the conditions described above, and was run on a drum under a load of 1.75 kN by using a drum tester so as to gradually increase a speed up to 230 km/h in 20 minutes, and then increase the speed from 230 km/h by 10 km/h per 10 minutes, and a speed (fracture velocity) obtained when a delamination damage occurred in a tread rubber, and a driving time at that speed were measured. The evaluations are indicated as indexes on the assumption that a value for comparative example 1 is 100. The greater a value of the index is, the more favorable the result is.

<Rolling Resistance Performance>

A rolling resistance was measured by using a rolling resistance tester on the following conditions. The evaluations are indicated as indexes on the assumption that a value for comparative example 1 is 100. The greater a value of the index is, the less the rolling resistance is, that is, the more favorable the result is.
Internal pressure: 290 kPa
Load: 1.30 kN
Speed: 80 km/h
Test results are indicated in table 1.

TABLE 1

| | Comparative example 1 | Comparative example 2 | Example 1 | Example 2 | Example 3 | Comparative example 3 | Comparative example 4 |
|---|---|---|---|---|---|---|---|
| Width L1b (mm) of center base layer CRb | — | 31 | 57.5 | 103.5 | 109.3 | 126.5 | 103.5 |
| L6/L1b (%) | — | 110.0 | 60.0 | 33.0 | 31.6 | 27.0 | 33.0 |
| L1b/L4 (%) | — | 27.0 | 50.0 | 90.0 | 95.0 | 110.0 | 90.0 |
| Composition of center base layer | — | Composition 1 | Composition 1 | Composition 1 | Composition 1 | Composition 1 | Composition 3 |
| Composition of center cap layer | — | Composition 2 | Composition 2 | Composition 2 | Composition 2 | Composition 2 | Composition 2 |
| Composition of middle rubber | — | Composition 3 | Composition 3 | Composition 3 | Composition 3 | Composition 3 | Composition 3 |
| Composition of shoulder rubber | — | Composition 4 | Composition 4 | Composition 4 | Composition 4 | Composition 4 | Composition 4 |
| Loss tangent tanδ1b of center base layer | — | 0.06 | 0.06 | 0.06 | 0.06 | 0.06 | 0.21 |
| Loss tangent tanδ1c of center cap layer | — | 0.10 | 0.10 | 0.10 | 0.10 | 0.10 | 0.10 |
| Loss tangent tanδ2 of middle rubber | — | 0.21 | 0.21 | 0.21 | 0.21 | 0.21 | 0.21 |
| Loss tangent tanδ3 of shoulder rubber | — | 0.29 | 0.29 | 0.29 | 0.29 | 0.29 | 0.29 |
| Complex elastic modulus E*1b (MPa) of center base layer | — | 2.90 | 2.90 | 2.90 | 2.90 | 2.90 | 4.25 |

TABLE 1-continued

| | | | | | | |
|---|---|---|---|---|---|---|
| Complex elastic modulus E*1c (MPa) of center cap layer | — | 4.10 | 4.10 | 4.10 | 4.10 | 4.10 | 4.10 |
| Complex elastic modulus E*2 (MPa) of middle rubber | — | 4.25 | 4.25 | 4.25 | 4.25 | 4.25 | 4.25 |
| Complex elastic modulus E*3 (MPa) of shoulder rubber | — | 5.90 | 5.90 | 5.90 | 5.90 | 5.90 | 5.90 |
| Rubber hardness Hs1b (degree) of center base layer | — | 54.00 | 54.00 | 54.00 | 54.00 | 54.00 | 64.00 |
| Rubber hardness Hs1c (degree) of center cap layer | — | 63.00 | 63.00 | 63.00 | 63.00 | 63.00 | 63.00 |
| Rubber hardness Hs2 (degree) of middle rubber | — | 64.00 | 64.00 | 64.00 | 64.00 | 64.00 | 64.00 |
| Rubber hardness Hs3 (degree) of shoulder rubber | — | 67.00 | 67.00 | 67.00 | 67.00 | 67.00 | 67.00 |
| Angle α2i (°) of boundary line B1 | — | 60 | 60 | 60 | 60 | 60 | 60 |
| Angle α2o (°) of boundary line B2 | — | 60 | 60 | 60 | 60 | 60 | 60 |
| Cornering performance (index) [the greater, the better] | 100 | 120 | 120 | 120 | 115 | 105 | 120 |
| Transient characteristics (index) [the greater, the better] | 100 | 102 | 102 | 101 | 98 | 90 | 100 |
| High-speed-durability performance (index) [the greater, the better] | 100 | 112 | 115 | 120 | 120 | 120 | 110 |
| Rolling resistance performance (index) [the greater, the better] | 100 | 110 | 112 | 115 | 115 | 115 | 107 |

| | Example 4 | Example 5 | Example 6 | Example 7 | Example 8 |
|---|---|---|---|---|---|
| Width L1b (mm) of center base layer CRb | 103.5 | 103.5 | 103.5 | 103.5 | 103.5 |
| L6/L1b (%) | 33.0 | 33.0 | 33.0 | 33.0 | 33.0 |
| L1b/L4 (%) | 90.0 | 90.0 | 90.0 | 90.0 | 90.0 |
| Composition of center base layer | Composition 1 | Composition 1 | Composition 1 | Composition 1 | Composition 1 |
| Composition of center cap layer | Composition 2 | Composition 2 | Composition 2 | Composition 2 | Composition 2 |
| Composition of middle rubber | Composition 3 | Composition 3 | Composition 3 | Composition 3 | Composition 3 |
| Composition of shoulder rubber | Composition 3 | Composition 4 | Composition 4 | Composition 4 | Composition 4 |
| Loss tangent tanδ1b of center base layer | 0.06 | 0.06 | 0.06 | 0.06 | 0.06 |
| Loss tangent tanδ1c of center cap layer | 0.10 | 0.10 | 0.10 | 0.10 | 0.10 |
| Loss tangent tanδ2 of middle rubber | 0.21 | 0.21 | 0.21 | 0.21 | 0.21 |
| Loss tangent tanδ3 of shoulder rubber | 0.21 | 0.29 | 0.29 | 0.29 | 0.29 |
| Complex elastic modulus E*1b (MPa) of center base layer | 2.90 | 2.90 | 2.90 | 2.90 | 2.90 |
| Complex elastic modulus E*1c (MPa) of center cap layer | 4.10 | 4.10 | 4.10 | 4.10 | 4.10 |
| Complex elastic modulus E*2 (MPa) of middle rubber | 4.25 | 4.25 | 4.25 | 4.25 | 4.25 |
| Complex elastic modulus E*3 (MPa) of shoulder rubber | 4.25 | 5.90 | 5.90 | 5.90 | 5.90 |
| Rubber hardness Hs1b (degree) of center base layer | 54.00 | 54.00 | 54.00 | 54.00 | 54.00 |
| Rubber hardness Hs1c (degree) of center cap layer | 63.00 | 63.00 | 63.00 | 63.00 | 63.00 |
| Rubber hardness Hs2 (degree) of middle rubber | 64.00 | 64.00 | 64.00 | 64.00 | 64.00 |
| Rubber hardness Hs3 (degree) of shoulder rubber | 64.00 | 67.00 | 67.00 | 67.00 | 67.00 |
| Angle α2i (°) of boundary line B1 | 60 | 10 | 15 | 75 | 80 |
| Angle α2o (°) of boundary line B2 | 60 | 10 | 15 | 75 | 80 |
| Cornering performance (index) [the greater, the better] | 110 | 115 | 117 | 115 | 110 |
| Transient characteristics (index) [the greater, the better] | 98 | 90 | 92 | 98 | 96 |
| High-speed-durability performance (index) [the greater, the better] | 120 | 120 | 120 | 120 | 120 |
| Rolling resistance performance (index) [the greater, the better] | 115 | 115 | 115 | 115 | 115 |

TABLE 2

| | Composition 1 | Composition 2 | Composition 3 | Composition 4 | Composition 5 | Composition 6 | Composition 7 | Composition 8 | Composition 9 | Composition 10 | Composition 11 | Composition 12 |
|---|---|---|---|---|---|---|---|---|---|---|---|---|
| NR | 50 | 50 | 30 | 30 | 50 | 50 | 50 | 50 | 50 | 50 | 30 | 30 |
| SBR | 50 | 50 | 70 | 70 | 50 | 50 | 50 | 50 | 50 | 50 | 70 | 70 |
| Carbon black | 5 | 60 | 70 | 80 | 5 | 25 | 15 | 25 | 35 | 45 | 75 | 75 |
| Process oil | 15 | 15 | 20 | 25 | 20 | 20 | 20 | 25 | 25 | 25 | 22.5 | 21 |
| Antioxidant 6C | 2.0 | 2.0 | 2.0 | 2.0 | 2.0 | 2.0 | 2.0 | 2.0 | 2.0 | 2.0 | 2.0 | 2.0 |
| Stearic acid | 1.5 | 1.5 | 1.5 | 1.5 | 1.5 | 1.5 | 1.5 | 1.5 | 1.5 | 1.5 | 1.5 | 1.5 |
| Zinc oxide | 2.0 | 2.0 | 2.0 | 2.0 | 2.0 | 2.0 | 2.0 | 2.0 | 2.0 | 2.0 | 2.0 | 2.0 |
| Sulfur | 2.0 | 2.0 | 2.0 | 2.0 | 2.0 | 2.0 | 2.0 | 2.0 | 2.0 | 2.0 | 2.0 | 2.0 |
| Vulcanization accelerator (NS) | 1.5 | 2.0 | 2.0 | 2.0 | 1.5 | 1.5 | 1.5 | 1.5 | 1.5 | 1.5 | 2.0 | 2.0 |
| Vulcanization accelerator (DPG) | 1.5 | — | — | — | 1.5 | 1.5 | 1.5 | 1.5 | 1.5 | 1.5 | — | — |
| Wax | 2.0 | 2.0 | 2.0 | 2.0 | 2.0 | 2.0 | 2.0 | 2.0 | 2.0 | 2.0 | 2.0 | 2.0 |
| Silica | 55 | — | — | — | 65 | 55 | 55 | 45 | 45 | 35 | — | — |
| Silane coupling agent | 5.5 | — | — | — | 6.5 | 5.5 | 4.5 | 4.5 | 4.5 | 3.5 | — | — |

The values of the composition rates are each represented as parts by mass.

According to the test results, it can be confirmed that the tires of examples enable rolling resistance performance, high-speed-durability performance, and cornering performance to be simultaneously realized at high levels.

EXAMPLE II

Two-wheeled automotive vehicle tires each having the fundamental structure shown in FIG. 3, and each including middle rubbers and shoulder rubbers of the specifications indicated in table 3 were manufactured and tested for performances. Further, the conventional tire shown in FIG. 5 was similarly tested for comparison.

The common specifications are the same as those for example I except for the following points. The test methods are the same as those for example I.
 Composition of center base layer: composition 1
 Composition of center cap layer: composition 2
 Loss tangent tan δ1b of center base layer: 0.06
 Loss tangent tan δ1c of center cap layer: 0.10
 Test results are indicated in table 3.

According to the test results, it can be confirmed that the tires of examples enable rolling resistance performance, high-speed-durability performance, and cornering performance to be simultaneously realized at high levels.

EXAMPLE III

Two-wheeled automotive vehicle tires each having the fundamental structure shown in FIG. 4, and each including middle rubbers of the specifications indicated in table 4 were manufactured and tested for performances. Further, the conventional tire shown in FIG. 5 was similarly tested for comparison.

The common specifications are the same as those for example I except for the following points. The test methods are the same as those for example I.
 Length L2o of outside middle rubber MDo: 50 mm
 Ratio L2o/L4: 43.5%
 Length L6 of ground contact surface in tire axial direction during straight running: 42 mm
 Composition of center base layer: composition 1
 Composition of center cap layer: composition 2
 Composition of shoulder rubber: composition 4

TABLE 3

| | Comparative Example 1 | Example 1 | Example 2 | Example 3 | Example 4 | Example 5 |
|---|---|---|---|---|---|---|
| Composition of middle base layer | — | Composition 5 | Composition 7 | Composition 8 | Composition 5 | Composition 5 |
| Composition of middle cap layer | — | Composition 3 | Composition 3 | Composition 3 | Composition 3 | Composition 3 |
| Composition of shoulder base layer | — | Composition 6 | Composition 6 | Composition 6 | Composition 9 | Composition 10 |
| Composition of shoulder cap layer | — | Composition 4 | Composition 4 | Composition 4 | Composition 4 | Composition 4 |
| Loss tangent tanδ2b of middle base layer | — | 0.05 | 0.07 | 0.09 | 0.05 | 0.05 |
| Loss tangent tanδ2c of middle cap layer | — | 0.21 | 0.21 | 0.21 | 0.21 | 0.21 |
| Loss tangent tanδ3b of shoulder base layer | — | 0.10 | 0.10 | 0.10 | 0.12 | 0.16 |
| Loss tangent tanδ3c of shoulder cap layer | — | 0.29 | 0.29 | 0.29 | 0.29 | 0.29 |
| tanδ2b/tanδ2c (%) | — | 23.8 | 33.3 | 42.9 | 23.8 | 23.8 |
| tanδ3b/tanδ3c (%) | — | 34.5 | 34.5 | 34.5 | 41.4 | 55.2 |
| Cornering performance (index) [the greater, the better] | 100 | 108 | 112 | 115 | 110 | 113 |
| Transient characteristics (index) [the greater, the better] | 100 | 98 | 98 | 98 | 99 | 100 |
| High-speed-durability performance (index) [the greater, the better] | 100 | 125 | 122 | 119 | 123 | 121 |
| Rolling resistance performance (index) [the greater, the better] | 100 | 117 | 115 | 113 | 116 | 115 |

Test results are indicated in table 4.

TABLE 4

| | Comparative example 1 | Example 1 | Example 2 |
|---|---|---|---|
| Composition of inside middle rubber | — | Composition 3 | Composition 3 |
| Composition of outside middle rubber | — | Composition 11 | Composition 12 |
| Loss tangent $\tan\delta 2i$ of inside middle rubber | — | 0.21 | 0.21 |
| Loss tangent $\tan\delta 2o$ of outside middle rubber | — | 0.22 | 0.25 |
| $\tan\delta 2i/\tan\delta 2o$ (%) | — | 95.5 | 84.0 |
| Complex elastic modulus $E^*2i$ (MPa) of inside middle rubber | — | 4.25 | 4.25 |
| Complex elastic modulus $E^*2o$ (MPa) of outside middle rubber | — | 4.30 | 4.70 |
| $E^*2i/E^*2o$ (%) | — | 98.8 | 90.4 |
| Rubber hardness Hs2i (degree) of inside middle rubber | | 64.00 | 64.00 |
| Rubber hardness Hs2o (degree) of outside middle rubber | | 65.00 | 67.00 |
| Hs2i/Hs2o (%) | | 98.5 | 95.5 |
| Cornering performance (index) [the greater, the better] | 100 | 125 | 120 |
| Transient characteristics (index) [the greater, the better] | 100 | 105 | 102 |
| High-speed-durability performance (index) [the greater, the better] | 100 | 118 | 115 |
| Rolling resistance performance (index) [the greater, the better] | 100 | 113 | 111 |

According to the test results, it can be confirmed that the tires of examples enable rolling resistance performance, high-speed-durability performance, and cornering performance to be simultaneously realized at high levels.

DESCRIPTION OF THE REFERENCE CHARACTERS 1 two-wheeled automotive vehicle tire
2G tread rubber
CR center rubber
CRb center base layer
MD middle rubber
SH shoulder rubber

The invention claimed is:

1. A two-wheeled automotive vehicle tire which includes a tread portion having an outer surface that extends so as to be curved such that the outer surface is convex outward in a tire radial direction and is arc-shaped, wherein
a tread rubber disposed in the tread portion includes: a center rubber disposed in a region including a tire equator as a center thereof; shoulder rubbers disposed on tread end sides; and middle rubbers disposed between the center rubber and the shoulder rubbers, respectively,
the center rubber includes a center cap layer of the outer surface of the tread portion; and a center base layer disposed inward of the center cap layer in the tire radial direction,
a loss tangent of the center base layer is less than a loss tangent of each of the center cap layer, the middle rubbers, and the shoulder rubbers, and
a width of the center base layer in a tire axial direction is greater than a length of a ground contact surface in the tire axial direction during straight running, and ranges from 50% of a length from the tire equator to a tread end along the outer surface of the tread portion to 95% thereof,
wherein a complex elastic modulus $E^*1b$ of the center base layer, a complex elastic modulus $E^*1c$ of the center cap layer, a complex elastic modulus $E^*2$ of each middle rubber, and a complex elastic modulus $E^*3$ of each shoulder rubber satisfy the following expression (2):

$$E^*1b<E^*1c<E^*2<E^*3 \qquad (2).$$

2. The two-wheeled automotive vehicle tire according to claim 1, wherein a cross section of each middle rubber has a tapered shape in which a length of the cross section in the tire axial direction is reduced inward in the tire radial direction.

3. The two-wheeled automotive vehicle tire according to claim 1 or 2, wherein a loss tangent $\tan\delta 1b$ of the center base layer, a loss tangent $\tan\delta 1c$ of the center cap layer, a loss tangent $\tan\delta 2c$ of each middle rubber, and a loss tangent $\tan\delta 3$ of each shoulder rubber satisfy the following expression (1):

$$\tan\delta 1b<\tan\delta 1c<\tan\delta 2<\tan\delta 3 \qquad (1).$$

4. The two-wheeled automotive vehicle tire according to claim 1, wherein a rubber hardness Hs1b of the center base layer, a rubber hardness Hs1c of the center cap layer, a rubber hardness Hs2 of each middle rubber, and a rubber hardness Hs3 of each shoulder rubber satisfy the following expression (3):

$$Hs1b<Hs1c<Hs2<Hs3 \qquad (3).$$

5. The two-wheeled automotive vehicle tire according to claim 1, wherein the middle rubbers are formed of a rubber having a uniform composition and the shoulder rubbers are formed of a rubber having a uniform composition, over a range from an inside in the tire radial direction toward the outer surface of the tread portion.

6. The two-wheeled automotive vehicle tire according to claim 1, wherein
each middle rubber includes a middle cap layer of the outer surface of the tread portion, and a middle base layer disposed inward of the middle cap layer in the tire radial direction, and
each shoulder rubber includes a shoulder cap layer of the outer surface of the tread portion, and a shoulder base layer disposed inward of the shoulder cap layer in the tire radial direction.

7. The two-wheeled automotive vehicle tire according to claim 6, wherein
a loss tangent $\tan\delta 2c$ of the middle cap layer and a loss tangent $\tan\delta 2b$ of the middle base layer satisfy the following expression (4), and
a loss tangent $\tan\delta 3c$ of the shoulder cap layer and a loss tangent $\tan\delta 3b$ of the shoulder base layer satisfy the following expression (5):

$$\tan\delta 2c>\tan\delta 2b \qquad (4),$$

$$\tan\delta 3c>\tan\delta 3b \qquad (5).$$

8. The two-wheeled automotive vehicle tire according to claim 6 or 7, wherein the loss tangent $\tan\delta 1b$ of the center base layer, the loss tangent $\tan\delta 2b$ of the middle base layer, and the loss tangent $\tan\delta 3b$ of the shoulder base layer satisfy the following expression (6):

$$\tan\delta 1b<\tan\delta 2b<\tan\delta 3b \qquad (6).$$

* * * * *